May 3, 1966  T. N. HULL, JR., ETAL  3,248,880
GAS TURBINE ENGINE LUBRICATION MEANS
Filed Oct. 9, 1964  3 Sheets-Sheet 1

INVENTORS.
THOMAS N. HULL, JR.
FRANCIS D. DOHERTY
WILBERT B. FREID
BY George R. Powers
ATTORNEY—

May 3, 1966 T. N. HULL, JR., ETAL 3,248,880
GAS TURBINE ENGINE LUBRICATION MEANS
Filed Oct. 9, 1964 3 Sheets-Sheet 2

INVENTORS.
THOMAS N. HULL, JR.
FRANCIS D. DOHERTY
WILBERT B. FREID
BY
George R. Powers
ATTORNEY

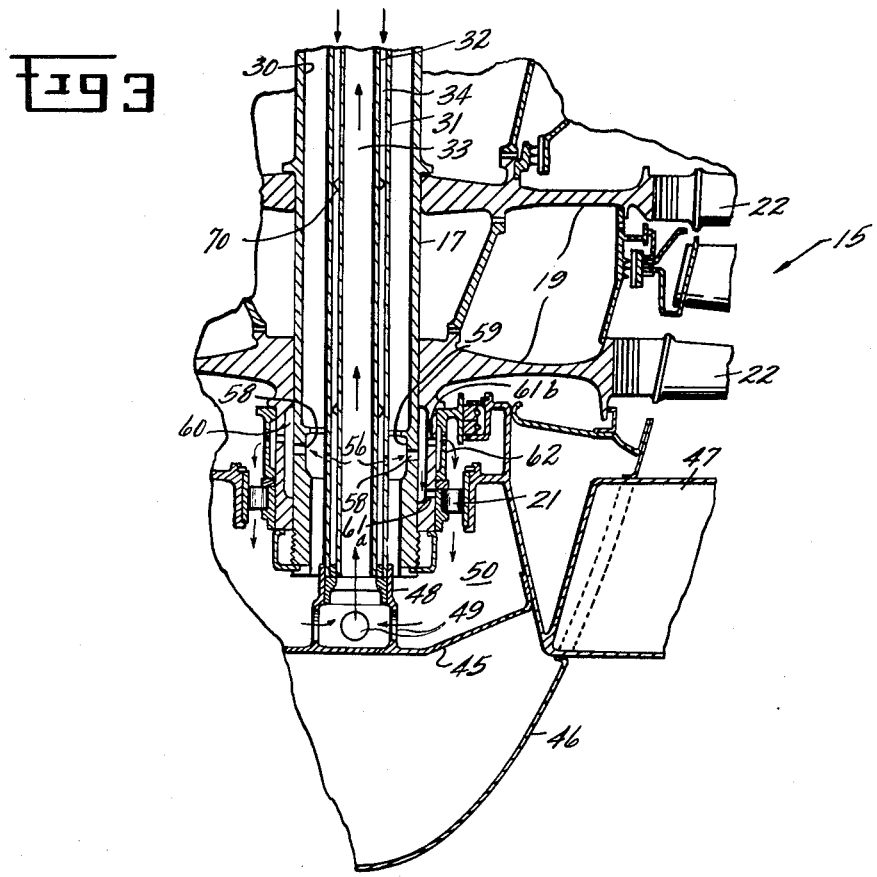

United States Patent Office 3,248,880
Patented May 3, 1966

3,248,880
GAS TURBINE ENGINE LUBRICATION MEANS
Thomas Neil Hull, Jr., Marblehead, Wilbert Bernard
Freid, Swampscott, and Francis Daniel Doherty, Melrose, Mass., assignors to General Electric Company,
a corporation of New York
Filed Oct. 9, 1964, Ser. No. 402,725
13 Claims. (Cl. 60—39.08)

This invention relates to lubrication means for rotating turbo-machinery and, more particularly, to improved internal lubrication means utilizing stationary tubing for lubricating the shaft bearings of a gas turbine engine.

It is rather difficult for various reasons to lubricate adequately the shaft bearings of gas turbine engines. The problems typically encountered will readily be appreciated, however, when considered in light of the environmental conditions encountered during engine operation. Temperature, for example, can be a formidable problem which must be overcome. Shaft bearings, particularly at the turbine end of the engine, commonly operate at temperatures as high as 400° F. In addition, it is typical to supply lubricant from the outer periphery of the engine to the bearings through radial conduits extending across the annular stream of combustion gases having temperatures as high as 1300° F. Since conventional lubricants cannot withstand such extreme temperature, it is usually necessary to insulate the radial conduits, the result being increased blockage of the gas stream and, consequently, increased pressure losses and decreased performance and efficiency. A closely related problem concerns engine weight and size, the external components, connections, and insulation required by such prior art arrangements adding, of course, to the external dimensions of the engine and to the total engine weight. In the case of aircraft gas turbine engine applications where space is commonly restricted and where there is a direct correlation between weight and the various performance characteristics, the external type of lubrication system just described may be disadvantageous because of these reasons.

It has been proposed in the past that the above difficulties be overcome through the use of an internal lubrication system in which lubricant is supplied to the bearings and returned to the lubricant reservoir or tank through conduits mounted within the main shaft and rotating therewith. For example, it has been proposed that hollow, axial tie rods be used as these conduits, the tie rods also serving to hold the various rotor elements in an integral rotor assembly. It has been found, however, that certain deficiencies are associated with this approach. With the lubricant conduits rotating at the speed of the main shaft, which for lightweight gas turbine engines of the aircraft type is typically in the vicinity of 17,000 r.p.m., it is difficult to provide adequate seals for preventing leakage of lubricant where the rapidly rotating conduits are joined to associated stationary structure. Another problem directly related to the high rotary speed is one of balance. Even small inaccuracies in the concentricity of the lubricant conduits are magnified greatly at such high speeds and thus can adversely affect the dynamic balance of the entire turbomachine.

It is an object of this invention to provide for turbomachines an improved internal lubricant means which does not utilize rotating tubes or conduits.

It is another object of this invention to provide for turbomachines an improved internal lubricant means which does not increase the external dimensions of the engine and does not increase the total engine weight.

A further object of the present invention is to provide for turbomachines lubricant means having a simplified sealing arrangement for preventing leakage of lubricant.

A still further object of the present invention is to provide a lubricant system in which small inaccuracies in manufacturing the elements comprising the lubricant system do not significantly affect the dynamic balance of the turbomachine.

In carrying out the invention in one form, two stationary conduits or tubes are coaxially mounted within the hollow cylindrical shaft of a turbine engine, the tubes forming coaxial inner and outer passageways. A lubricant reservoir is located at one end of the engine, and a pump supplies lubricant therefrom under pressure to the outer passageway. Openings are provided in the outer tube through which lubricant under pressure is supplied from the outer passageway to the shaft bearings, the lubricant then collecting in sumps at the bearings. The sump at the same end of the engine as the lubricant tank is connected to the tank by a return conduit while the sump at the remote end of the engine is connected in fluid communication with the tank through the inner passageway formed by the inner of the coaxial tubes. Since the coaxial tubes, the tank, the inlet and outlet sections of the pump, and the sumps are all stationary, simplified seals such as conventional O-rings can be used to prevent leakage of the lubricant.

By a further aspect of the invention, channels are provided in the inner surface of the engine shaft radially inward of the shaft bearings and in substantial axial alignment with both the bearings and the openings in the outer tube for receiving pressurized fluid from the outer passageway, and the openings in the outer tube are sized such that the proper quantities of lubricant for lubricating and cooling the bearings and associated structure are sprayed therefrom into the channels. Openings are provided in the channels for supplying the lubricant therefrom to the bearings. Also, in accordance with the invention, the lubricant reservoir, the pump for forcing the pressurized lubricant through the outer passageway and the openings to the bearings, and the scavenge pumps for returning the lubricant from the sumps to the reservoir may be mounted in a compact arrangement at one end of the engine on substantially the centerline of the engine. Thus, the lubrication means does not increase the external dimensions of the engine, and total weight is held to a minimum.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 3 is a detailed view of the lubrication means at the turbine end of the engine.

Figure 1:
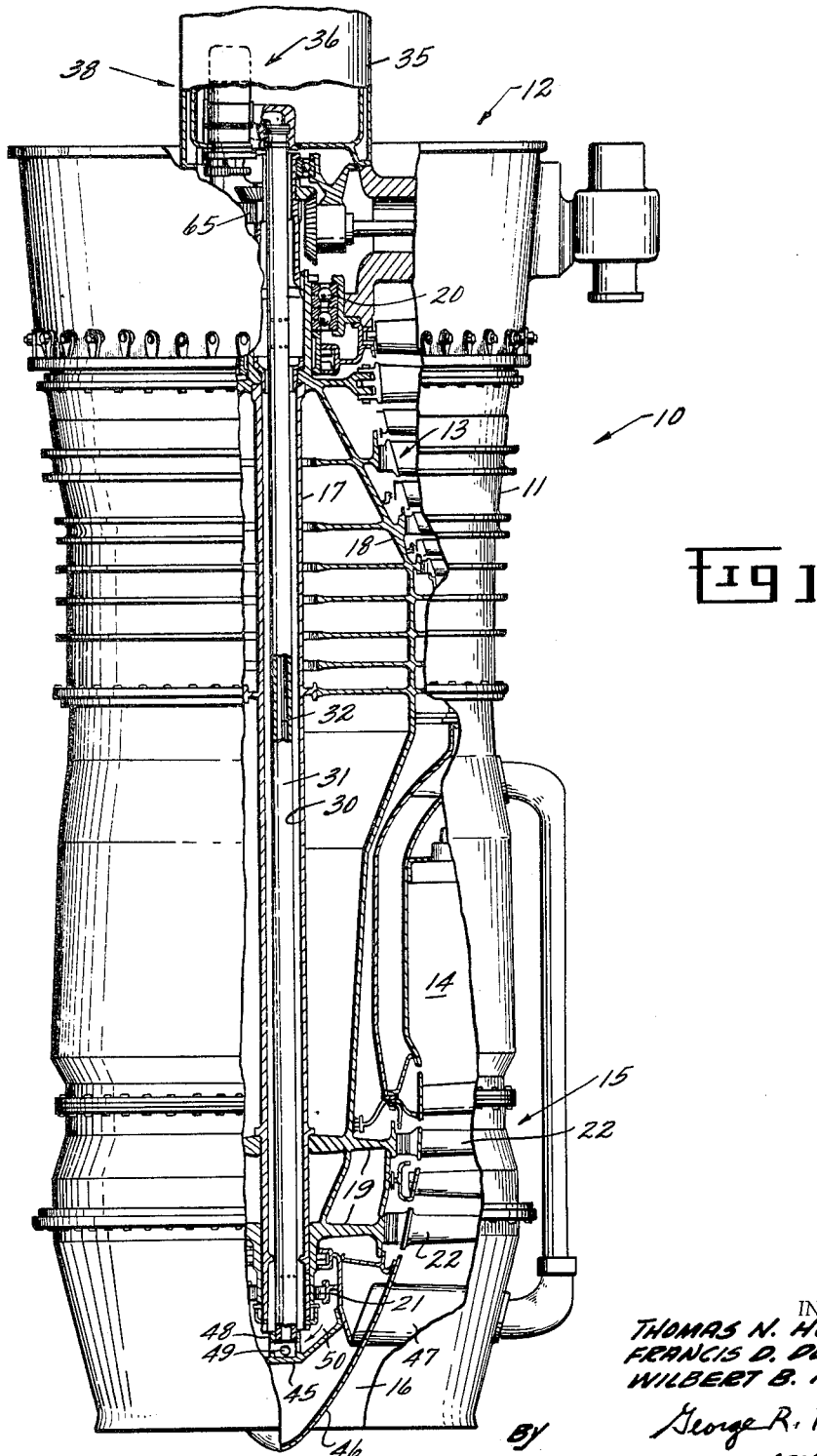
FIG. 1 is a view, partially in cross-section, of a turbojet engine having the lubrication means of this invention.

Referring first to FIG. 1, the lubrication means of this invention is illustrated in a gas turbine engine 10 of the conventional turbojet type. The lubrication means of this invention is particularly suited for use with direct lift jet engines in which the engine is mounted vertically such that the stream of exhaust products is discharged downwardly to produce vertical lift on the aircraft or other propelled vehicle, such as a ground effect or air cushion machine which hovers a few feet above the ground surface. Accordingly, the lubrication means is illustrated in a direct lift turbojet engine; however, it will become obvious as this specification proceeds that the invention can be used in conjunction with more conventional horizontal thrust machines with minor changes in the sump arrangement. The direct lift engine 10 illustrated by FIG. 1 has a cylindrical, segmented engine casing 11 enclosing in serial flow arrangement an inlet section 12 at its upper end, an axial flow compressor 13, an annular combustor 14, a gas generator turbine 15, and an exhaust section 16 through which high temperature products of combustion are discharged downward at high velocity to produce the thrust. A vertical main shaft 17 connects the drum rotor 18 of the compressor 13 to the rotor discs 19 of the turbine 15 to form a rigid rotor assembly, this integral rotor assembly being rotatably supported by bearings 20 and 21 at the upper compressor and lower turbine ends, respectively, of the engine 10. The combustion products leaving the annular combustor 14 impinge on the turbine buckets 22 peripherally mounted on the rotor disc 19 to drive the entire rotor assembly at high speed.

The illustrated embodiment of the lubrication means of the present invention will now be described. With reference still being directed to FIG. 1, it will be noted that the shaft 17 is cylindrical and has a hollow interior 30 extending therethrough. Two stationary coaxial tubes 31 and 32 are mounted within the shaft interior 30, the tube 31 surrounding the tube 32 as shown by the partially cut away portion of FIG. 1 and in greater detail by FIGS. 2 and 3. The tubes 31 and 32 define inner and outer coaxial passageways 33 and 34, respectively, extending along the vertical axis of the engine 10.

Figure 2:
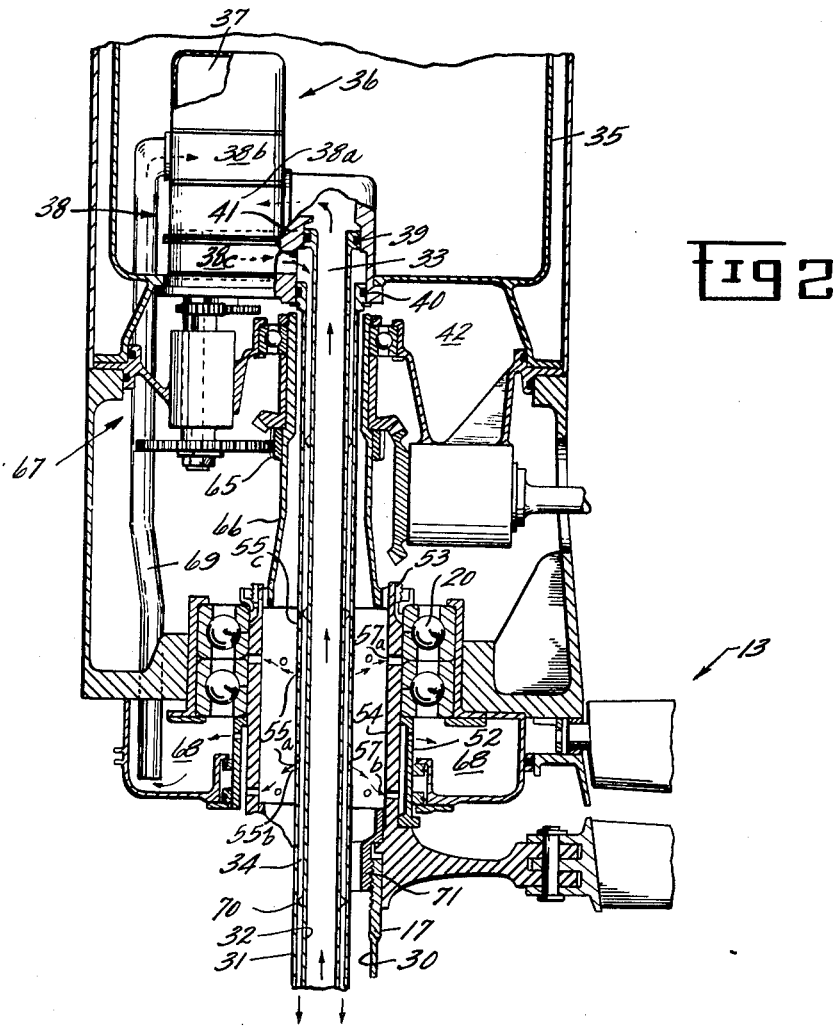
FIG. 2 is a detailed view of the lubrication means, including the lubricant tank and the lubrication and scavenge pumps, at the compressor end of the engine.

As best shown by FIG. 2, the bulletnose or inlet fairing 35 of the inlet section 12 has a lubricant tank assembly 36 mounted therein the tank assembly 36 including a lubricant reservoir 37 and a pump 38. The pump 38 is a three-element pump having three inlets and three outlets for performing simultaneously three separate pumping functions, the three elements being schematically illustrated as 38a, 38b, and 38c. The three elements, which may be vane or gear type pump elements, are driven through a gear train 62 in a manner to be described presently. The tubes 31 and 32 extend into the inlet fairing 35 and the tank assembly 36 such that the inner coaxial passageway 33, which is the interior of the inner tube 32, opens into the scavenge element 38a of the pump 38. Thus element 38a is a scavenge pump for drawing lubricant from the inner passageway 33 into the reservoir 37. Element 38b is also a scavenge pump, drawing lubricant from a conduit 69 into the reservoir 37. Element 38c of the pump 38 discharges lubricant under pressure into the outer coaxial passageway 34 formed between the two tubes 31 and 32. O-ring seals 39 and 40 are provided between the tubes 32 and 31 and the pump housing 41 to prevent the higher pressure lubricant discharged into the passageway 34 from re-entering the reservoir 47 or from escaping into the accessory gearing section 42 of the engine 10. Since the tubes 31 and 32 and the pump housing 41 are all stationary in accordance with the present invention, it will be appreciated that the sealing problems are relatively minor and can be handled adequately with conventional sealing means such as the O-rings 39 and 40.

Turning attention now to FIG. 3, the tubes 31 and 32 are supported at the turbine end of the engine 10 by a stationary interior wall 45 comprising a portion of the exhaust cone 46 which is in turn supported by radial support struts 47 extending inwardly from the engine casing 11. More particularly, the coaxial tubes 31 and 32 are both joined, preferably by brazing, to a cup-shaped member or end cap 48 and sealed thereby such that there is no direct communication between the coaxial passageways 33 and 34 at the turbine end of the engine 10. The member 48 has openings 49 therein providing fluid communication between a lubricant sump 49 associated with the bearing 21 and the inner passageway 33.

To supply the lubricant to the bearings 20 and 21 and their associated structure, openings are provided in the wall of the outer tube 31 through which the pressurized lubricant may be discharged. More particularly, with reference to FIG. 2, three sets of openings 55a, 55b, and 55c are provided in the outer tube 31 radially inward of the bearing 20 at the compressor end of the engine 10. A shallow annular channel 54 axially aligned with the openings is located in the inner surface of a forward extension 17a of the first stage compressor rotor, the extension 17a forming a portion of the complete shaft. The annular channel 54 extends axially between a spline 53 at the upper end and a connector 71 joining the extension 17a and the main shaft 17 at the lower end. The channel 54 receives lubricant sprayed outwardly through the openings, and openings 57a and 57b are provided in the shaft 17 for transmitting the lubricant to the bearing 20 and the seal runner 52. A portion of the lubricant can also pass outwardly through the shaft spline 53 from the channel 54. The openings 55a, 55b, and 55c are sized such that a proper amount of lubricant for lubricating and cooling the bearing 20 and its associated structure is sprayed into the channel 54, where centrifugal force then causes it to flow through the openings 57a and 57b and through the spline 53. These passages may be sized such that the lubricant is supplied in proper proportions to the bearing 20, the seal runner 52, and the spline 53.

With reference now directed to FIG. 3 and the other bearing, it will be seen that lubricant may flow outwardly from the outer passageway 34 through openings 56 in the outer tube 31, the openings 56 being sized such that a proper amount of lubricant is sprayed into an annular channel 59 in the shaft 17, from which centrifugal force causes the lubricant to flow outwardly through openings 58 in the shaft 17 into a chamber 60 from which a portion of the lubricant flows through each set of openings 61a and 61b to lubricate the bearing 21 and to cool the seal runner 62, respectively. The openings 61a and 61b are, of course, sized such that the total flow of lubricant is distributed in the proper proportions to the bearing 21 and the seal runner 62.

During operation of the gas turbine engine 10, the rotor assembly, including the shaft 17, is driven at high speed by the combustion gases impinging on the turbine buckets 22. Gear teeth 65 peripherally mounted on a forward extension 66 of the shaft 17 drive the pump 38 through a gear train 67 providing suitable speed reduction. As shown by the arrows, the supply element 38c of the pump 38 draws lubricant from the reservoir 37 and discharges it at high pressure into the outer passageway 34. A portion of the high pressure lubricant is sprayed outwardly through the openings 55a, 55b, and 55c in the outer tube 31 to lubricate the bearing 20 and cool its associated seal runner 52 at the upper compressor end of the engine 10 in the manner just described. After lubricating the bearing 20, cooling the seal 52, and lubricating the spline 53, gravity causes the lubricant to collect in a sump 68 associated with the bearing 20. The scavenge element 38b of the pump 38 causes the lubricant to return to the reservoir 37 through a return conduit 69, the conduit extending into the normal lower portion of the sump 63. Similarly, the remainder of the high pressure lubricant flows outwardly through the openings 56 in the tube 31 to lubricate the bearing 21 and cool its associated seal runner 62 at the turbine end of the engine 10. After lubricating the bearing 21 and cooling the seal 62, gravity causes the lubricant to collect in the sump 49, from which it flows through the openings 49 in the end cap 48 into the inner passageway 33. The lubricant is caused to flow upwardly through the passageway 33 and into the reservoir 37 by scavenge element 38a of the pump 38. It will also be seen that any lubricant which is sprayed outwardly through the openings in the shaft 17 and fails to reach one of the annular channels will drain into the sump 49 from which it will be returned to the reservoir 37.

Small projections 70 on the inner coaxial tube 32 extend radially outward to contact the outer tube 31 and maintain the radial spacing between the tubes. In addition, the projections tend to damp out any tube vibrations which may tend to occur during engine operation.

The embodiment of the invention illustrated and described herein is particularly suited for use in a direct lift engine having a vertical shaft and vertical lubricant tubes. It will be appreciated, however, that by providing suitable scavenge conduits the invention may be used in engines normally having other attitudes, including the conventional horizontal attitude. Briefly, the requirement is that the return conduits project into the normal lower portion of the sumps so that the return pickups are below the lubricant level. With reference to FIG. 3, this could be done by eliminating the openings 49 in the end cap 48 and providing a tube reaching from the end cap 48 into the normal lower portion of the sump 49. The return conduit 64 in the sump 63 would be, if necessary, repositioned to reach into the normal lower portion of the sump 68.

It will thus be seen that the lubrication means of the present invention provides a compact internal lubrication system which does not increase the external engine dimensions and which does not rely on rotating supply and return conduits presenting substantial sealing difficulties. Furthermore, since the various elements comprising the lubrication means of this invention are stationary, small inaccuracies in manufacturing do not significantly affect the dynamic balance of the turbomachine.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and desired to secure by Letters Patent of the United States is:

1. A gas turbine engine assembly comprising, in combination:
   (a) a cylindrical engine casing enclosing therein in axial spaced serial flow relationship a compressor, a combustor, and a turbine,
   (b) a hollow axially extending cylindrical shaft connecting said compressor and said turbine,
   (c) first and second bearings rotatably supporting said shaft at the compressor and turbine ends, respectively, of said engine,
   (d) inner and outer stationary tubes coaxially mounted within said shaft and extending the entire axial length of said shaft,
   (e) said stationary tubes defining coaxial inner and outer passageways,
   (f) a lubricant reservoir at the compressor end of said shaft,
   (g) first pumping means connecting said reservoir and said outer passageway for supplying lubricant to said outer passageway,
   (h) second pumping means connecting said inner passageway and said reservoir for returning lubricant to said reservoir,
   (i) said outer tube and said shaft having first and second sets of openings therein axially aligned with and radially inward of said first and second bearings,
   (j) a first sump adjacent the compressor end of said shaft for receiving lubricant from said first bearing,
   (k) first fluid passage means communicating with said first sump,
   (l) third pumping means connecting said first fluid passage means and said reservoir for returning lubricant thereto,
   (m) a second sump adjacent the turbine end of said shaft for receiving lubricant from said second bearing,
   (n) and second fluid passage means connecting said second sump and said inner passageway at the turbine end of said shaft,
   (o) whereby lubricant supplied to said outer passageway flows through said passageway and said first and second sets of openings to lubricant said bearings and whereby lubricant supplied to said second bearing returns to said reservoir through said inner passageway.

2. In a turbomachine including a hollow cylindrical shaft rotatably supported by at least one bearing, lubrication means for lubricating the bearing comprising:
   (a) first and second stationary tubes mounted within said rotatable shaft,
   (b) a lubricant reservoir at one end of said shaft in fluid communication with the interior of said second tube for receiving lubricant therefrom,
   (c) pumping means connecting said reservoir and the interior of said first tube for supplying lubricant to said first tube,
   (d) first fluid passage means connecting the interior of said first tube and said bearing,
   (e) and second fluid passage means connecting said bearing and the interior of said second tube,
   (f) whereby lubricant supplied to said first tube flows through said first passage means to lubricate said bearing and is returned from said bearing to said reservoir through said second passage means and said second tube.

3. Lubrication means as defined by claim 2 in which said second tube is coaxially mounted within said first tube and in which said pumping means connects said reservoir to the annular passageway formed between the coaxial tubes.

4. Lubrication means as defined by claim 3 in which said first fluid passage means includes openings in said first tube and said shaft generally axially aligned with and radially inward of said bearing.

5. For use in a turbomachine, lubrication means comprising:
   (a) a hollow cylindrical shaft rotatably supported by at least one bearing,
   (b) an annular channel in the inner surface of said shaft radially inward of the beaing,
   (c) inner and outer stationary tubes coaxially mounted within said rotatable shaft,
   (d) said tubes defining coaxial inner and outer passageways,
   (e) a lubricant reservoir at one end of said shaft in fluid communication with the inner passageway for receiving lubricant therefrom,
   (f) pumping means connecting said reservoir and said outer passageway for supplying pressurized lubricant to said outer passageway,
   (g) said outer tube having at least one opening therein radially inward of and in substantial axial alignment with the annular channel in said shaft,
   (h) said shaft having at least one opening in said channel communicating with said bearing,
   (i) and fluid passage means connecting said bearing and the inner passageway,
   (j) whereby pressurized lubricant supplied to said outer passageway is transmitted into said channel from which it flows to lubricate said bearing and returns from said bearing to said reservoir through said fluid passage means and said inner passageway.

6. Lubrication means as defined by claim 5 in which the opening in said outer tube is sized such that the proper quantity of lubricant for lubricating said bearing is sprayed outwardly therefrom into said annular channel.

7. In a turbomachine including a hollow cylindrical shaft rotatably supported by at least first and second bearings adjacent first and second ends thereof, lubrication means for lubricating the bearings comprising:
(a) inner and outer stationary tubes coaxially mounted within said rotatable shaft,
(b) said tubes defining coaxial inner and outer passageways,
(c) a lubricant reservoir at the first end of said shaft,
(d) first pumping means connecting said reservoir and said outer passageway for supplying lubricant to said outer passageway,
(e) second pumping means connecting said inner passageway and said reservoir for returning lubricant to said reservoir,
(f) first and second fluid passage means connecting said outer passageway and said first and second bearings, respectively,
(g) a first sump adjacent said first end of said shaft for receiving lubricant from said first bearing,
(h) third fluid passage means communicating with said first sump,
(i) third pumping means connecting said third fluid passage means and said reservoir for returning lubricant thereto,
(j) a second sump adjacent said second end of said shaft for receiving lubricant from said second bearing,
(k) and fourth fluid passage means connecting said second sump and said inner passageway at said second end of said shaft,
(l) whereby lubricant supplied to said outer passageway flows through said passageway and said first and second fluid passage means to lubricate said bearings and whereby lubricant supplied to said second bearing returns to said reservoir through said inner passageway.

8. Lubrication means as defined by claim 7 in which said first, second, and third pumping means are located at the first end of said shaft.

9. A gas turbine engine assembly comprising, in combination:
(a) a cylindrical engine casing enclosing therein in axial spaced serial flow relationship a compressor, a combustor, and a turbine,
(b) a hollow axially extending cylindrical shaft connecting said compressor and said turbine,
(c) first and second bearings rotatably supporting said shaft at the compressor and turbine ends, respectively, of said engine,
(d) inner and outer stationary tubes coaxially mounted within said shaft and extending the entire axial length of said shaft,
(e) said stationary tubes defining coaxial inner and outer passageways,
(f) a lubricant reservoir at the compressor end of said shaft,
(g) first pumping means connecting said reservoir and said outer passageway for supplying lubricant to said outer passageway,
(h) second pumping means connecting said inner passageway and said reservoir for returning lubricant to said reservoir,
(i) first and second annular channels in the inner surface of said shaft radially inward of said first and second bearings, respectively,
(j) said outer tube having at least one opening therein radially inward of and in substantial axial alignment with the first annular channel and having at least one opening therein radially inward of and in substantial axial alignment with the second annular channel,
(k) each of said first and second annular channels having at least one opening therein communicating with said first and second bearings,
(l) the opening in said outer tube being sized such that the proper quantities of lubricant for lubricating said bearings are sprayed outwardly therefrom into said channels,
(m) a first sump adjacent the compressor end of said shaft for receiving lubricant from said first bearing,
(n) first fluid passage means communicating with said first sump,
(o) third pumping means connecting said first fluid passage means and said reservoir for returning lubricant thereto,
(p) a second sump adjacent the turbine end of said shaft for receiving lubricant from said second bearing,
(q) and second fluid passage means connecting said second sump and said inner passageway at the turbine end of said shaft,
(r) whereby lubricant supplied to said outer passageway flows through said passageway and said first and second sets of openings to lubricate said bearings and whereby lubricant supplied to said second bearing returns to said reservoir through said inner passageway.

10. Lubrication means as defined by claim 9 in which said first, second, and third pumping means are located at the compressor end of said shaft.

11. Lubrication means as defined by claim 9 in which the annular space between said shaft and said outer tube is in fluid flow communication with at least one of said first and second sumps.

12. A gas turbine engine assembly as defined by claim 9 in which damping is provided between said stationary tubes.

13. A gas turbine engine assembly comprising, in combination:
(a) a cylindrical engine casing enclosing therein in axial spaced serial flow relationship a compressor, a combustor, and a turbine,
(b) a hollow axially extending cylindrical shaft connecting said compressor and said turbine,
(c) first and second bearings rotatably supporting said shaft at the compressor and turbine ends, respectively, of said engine,
(d) inner and outer stationary tubes coaxially mounted within said shaft and extending the entire axial length of said sahft,
(e) said stationary tubes defining coaxial inner and outer passageways,
(f) a lubricant reservoir at the compressor end of said shaft,
(g) first pumping means connecting said reservoir and said outer passageway for supplying lubricant to said outer passageway,
(h) second pumping means connecting said inner passageway and said reservoir for returning lubricant to said reservoir,
(i) at least one annular channel in the inner surface of said shaft radially inward of said first bearing and at least one annular channel in the inner surface of said shaft radially inward of said second bearing,
(j) said outer tube having a plurality of openings therein, at least one of said openings being radially inward of and in substantial axial alignment with each of said annular channels,
(k) each of said annular chambers having at least one opening therein communicating the respective bearing and its associated structure,
(l) the openings in said outer tube being sized such that the proper quantities of lubricant for lubricating and cooling said bearings and associated structure are sprayed outwardly therefrom into said channels,
(m) a first sump adjacent the compressor end of said shaft for receiving lubricant from said first bearing, (n) first fluid passage means communicating with said first sump,
(o) third pumping means connecting said first fluid passage means and said reservoir for returning lubricant thereto,
(p) a second sump adjacent the turbine end of said shaft for receiving lubricant from said second bearing,
(q) and second fluid passage means connecting said second sump and said inner passageway at the turbine end of said shaft,
(r) whereby lubricant supplied to said outer passageway flows through said passageway and said first and second sets of openings to lubricate said bearings and whereby lubricant supplied to said second bearing returns to said reservoir through said inner passageway.

References Cited by the Examiner

UNITED STATES PATENTS 2,693,248  11/1954  Gaubatz et al.
2,804,280  8/1957  Wheatley _____ 253—39.15

MARK NEWMAN, *Primary Examiner.*
C. R. CROYLE, *Assistant Examiner.*